United States Patent
Doad (10) Patent No.: US 10,332,422 B2
(45) Date of Patent: Jun. 25, 2019

(54) MANNEQUIN FOR PRACTICING CARDIOPULMONARY RESUSCITATION

(71) Applicant: SINGAPORE FIRST AID TRAINING CENTRE PTE LTD., Singapore (SG)

(72) Inventor: Abdul Rasheed Doad, Singapore (SG)

(73) Assignee: Singapore First Aid Training Centre PTE, LTD, Singapore (SG)

( * ) Notice: Subject to any disclaimer, the term of this patent is extended or adjusted under 35 U.S.C. 154(b) by 0 days.

(21) Appl. No.: 14/354,828

(22) PCT Filed: Sep. 18, 2012

(86) PCT No.: PCT/SG2012/000340
§ 371 (c)(1),
(2) Date: Apr. 28, 2014

(87) PCT Pub. No.: WO2014/046609
PCT Pub. Date: Mar. 27, 2014

(65) Prior Publication Data
US 2015/0187230 A1    Jul. 2, 2015

(51) Int. Cl.
*G09B 23/30* (2006.01)
*G09B 23/32* (2006.01)
*G09B 23/28* (2006.01)

(52) U.S. Cl.
CPC .......... *G09B 23/288* (2013.01); *G09B 23/30* (2013.01); *G09B 23/32* (2013.01)

(58) Field of Classification Search
CPC .................................................. G09B 23/288

(Continued)

(56) References Cited

U.S. PATENT DOCUMENTS 5,256,070 A * 10/1993 Garth ................... G09B 23/288
                                                                    434/265
5,312,259 A    5/1994 Flynn
(Continued)

FOREIGN PATENT DOCUMENTS

CN    202306929 U    7/2012
JP    3036934          2/1997
(Continued)

OTHER PUBLICATIONS

PCT International Search Report and Written Opinion dated Apr. 22, 2013 from PCT Application No. PCT/SG2012/000340 (WO 2014/046609).).

(Continued)

*Primary Examiner* — James B Hull
(74) *Attorney, Agent, or Firm* — McCarter & English, LLP (57) ABSTRACT

A mannequin for practicing cardiopulmonary resuscitation and a kit for assembling the mannequin for practicing cardiopulmonary resuscitation, the mannequin comprising a head having an inlet, a chest portion, a plate pivotably coupled to the chest portion, and an air collecting portion comprising an air chamber, an end of the air collecting portion being coupled to the inlet and the air chamber being disposed between the plate and the chest portion such that the plate pivots away from the chest portion when air is blown into the air chamber through said inlet and the plate pivots towards the chest portion when air is released from the air chamber.

22 Claims, 8 Drawing Sheets (58) Field of Classification Search
USPC .......................................................... 434/265
See application file for complete search history.

(56) References Cited

U.S. PATENT DOCUMENTS

| | | | | |
|---|---|---|---|---|
| 5,423,685 A * | 6/1995 | Adamson | ............. | G09B 23/288 434/265 |
| 5,628,633 A * | 5/1997 | Lehman | ............... | G09B 23/288 434/265 |
| 6,227,864 B1 * | 5/2001 | Egelandsdal | ........ | G09B 23/288 434/262 |
| 6,500,009 B1 | 12/2002 | Brault et al. | | |
| 6,530,783 B1 | 3/2003 | McGinnis | | |
| 2005/0058977 A1 * | 3/2005 | Cantrell | ............... | G09B 23/288 434/350 |
| 2007/0054254 A1 * | 3/2007 | Cook | .................... | G09B 23/30 434/262 |
| 2007/0105082 A1 * | 5/2007 | Laerdal | ............... | G09B 23/288 434/265 |
| 2008/0081321 A1 | 4/2008 | Cantrell et al. | | |
| 2009/0017431 A1 * | 1/2009 | Adams | ................. | G09B 23/288 434/265 |
| 2010/0285439 A1 * | 11/2010 | Mestad | ................. | G09B 23/288 434/272 |

FOREIGN PATENT DOCUMENTS

| | | |
|---|---|---|
| JP | 2011-509438 | 3/2011 |
| KR | 20-0366260 | 10/2004 |
| KR | 20-2011-0011791 | 12/2011 |
| KR | 10-2012-0014979 | 2/2012 |
| WO | WO 2010/147129 | 12/2010 |
| WO | PCT/SG2012/000340 | 9/2012 |

OTHER PUBLICATIONS

Japanese Office Action dated Apr. 5, 2016 from corresponding Japanese Application 2015-531891.
European Search Report and Written Opinion dated May 17, 2016 from corresponding European Application 12885045.0.

* cited by examiner

MANNEQUIN FOR PRACTICING CARDIOPULMONARY RESUSCITATION

FIELD OF THE INVENTION

The present invention relates to a mannequin for practicing cardiopulmonary resuscitation, in particular, a mannequin suitable for practicing mouth to mouth resuscitation and chest compression.

BACKGROUND

Traditionally, mannequins are used for practicing cardiopulmonary resuscitation (CPR). Typically, the mannequins simulate the human upper body including head, neck and chest, thus allowing mouth to mouth resuscitation to be performed through the mouth and/or nose of the mannequins, and chest compressions to be performed on the chest. The mannequins are fashioned to simulate human looks and responses during distress so that cardiopulmonary resuscitation on such mannequins can be easily correlated to that performed on a human being in an emergency situation.

However, the mannequins available are often expensive. Many of the available mannequins are made of expensive materials which eventually raise the cost of the mannequins. In CPR group training sessions, sometimes only a single mannequin is used by the entire group because of cost reasons. The CPR is performed by an experienced trainer and the trainees simply watch the trainer perform the CPR on the single mannequin. In other instances, the trainees take turns to perform CPR on the single available mannequin. As a result, the trainees do not receive sufficient hands-on experience and/or practice necessary to perform the CPR on a human in real life situations.

SUMMARY

In accordance with an aspect of the present invention, there is provided a mannequin for practicing cardiopulmonary resuscitation comprising: a head portion having an inlet; a chest portion; a plate pivotably coupled to the chest portion; and an air collecting portion comprising an air chamber, an end of the air collecting portion being coupled to the inlet and the air chamber being disposed between the plate and the chest portion such that the plate pivots away from the chest portion when air is blown into the air chamber through said inlet and the plate pivots towards the chest portion when air is released from the air chamber.

The plate may be biased to pivot towards the chest portion.

The plate may be biased to pivot towards the chest portion by a biasing mechanism comprising an elastic chord, an elastic fabric, or a spring.

The air collecting portion may pass through a passage located in a region where the plate and the chest portion are coupled.

The air collecting portion may be removable from the passage and the inlet.

The chest portion may be adapted to house a compressible member for simulating compression of the chest during cardiopulmonary resuscitation.

The compression member may be a resilient foam material.

The chest portion may comprise a compartment for housing the compressible member.

The compressible member may be compressible at least 5 cm deep from an uncompressed state.

The compressible member may be compressible up to a maximum of 5 cm deep from an uncompressed state.

The head portion, the chest portion or the plate may be made of cardboard.

The chest portion may comprise ribs being adapted for user contact to be aware of presence of ribs of a live being.

The mannequin may be shaped into a form resembling a toy character.

The air collecting portion may comprise another air chamber configurable to stack on top of the air chamber when the air collecting portion is deflated.

The inlet may be removable from the head portion.

The plate may be removable from the chest portion.

The mannequin may further comprise a joint for joining the head portion to the chest portion.

The air collecting portion may comprise an elongate air passage linking the end of the air collecting portion to the air chamber.

The air collecting portion may have a capacity of 400 to 600 ml (milliliters) of air.

The air collecting portion may have a capacity of 20 to 399 ml (milliliters) of air.

The head portion may be movable between a first configuration where the inlet is obstructing the air collecting portion from collecting air and a second configuration where the head portion is tilted relative to the chest portion to allow the air collecting portion to collect air.

The head portion may have a hollow centre and one or more support member may be located within the hollow centre.

In accordance with another aspect of the present invention, there is provided a kit for assembling the mannequin for practicing cardiopulmonary resuscitation, the kit comprising: the head portion; the chest portion; and the air collecting portion.

The kit may further comprise a compressible member for simulating compression of the chest portion during cardiopulmonary resuscitation.

The kit may further comprise the inlet.

The kit may further comprise the plate.

BRIEF DESCRIPTION OF THE DRAWINGS

Various embodiments of the invention will now be described, by way of example only, and with reference to the accompanying drawings in which.

Dotted lines in FIGS. 3B, 6A and 6B are included for clarity purposes only.

DETAILED DESCRIPTION

Figure 1A:
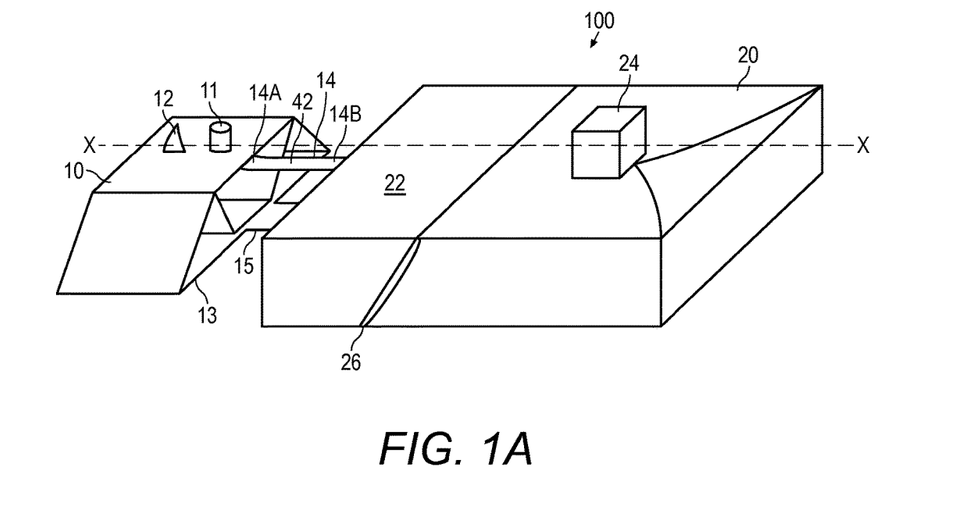
FIG. 1A is a perspective view of the mannequin.

FIG. 1A shows a mannequin (100) for practicing cardiopulmonary resuscitation (CPR). The mannequin (100) is lying horizontally on a surface on which the mannequin is to be placed during CPR practice and is made of a material that can retain shape and general configuration of the mannequin, such as cardboard, plastic and the like. The material may include rigid materials that are unable to bend, such as plywood.

The mannequin (100) has a head portion (10), a chest portion (20), a plate (22) and an air collecting portion (14). The head portion (10), the chest portion (20) and the plate (22) are facing upwards, i.e. away from the surface on which the mannequin is to be placed during CPR practice. The head portion (10) has an inlet (11) simulating a mouth, which in this case is a tubular inlet for allowing a CPR practitioner to exhale air into the air collecting portion (14). The plate (22) is pivotably coupled to the chest portion (20) for simulating human chest response during CPR. It should be noted that the inlet (11) may have cross sections other than circular. Furthermore, the inlet (11) may have shapes other than cylindrical.

Figure 5A:
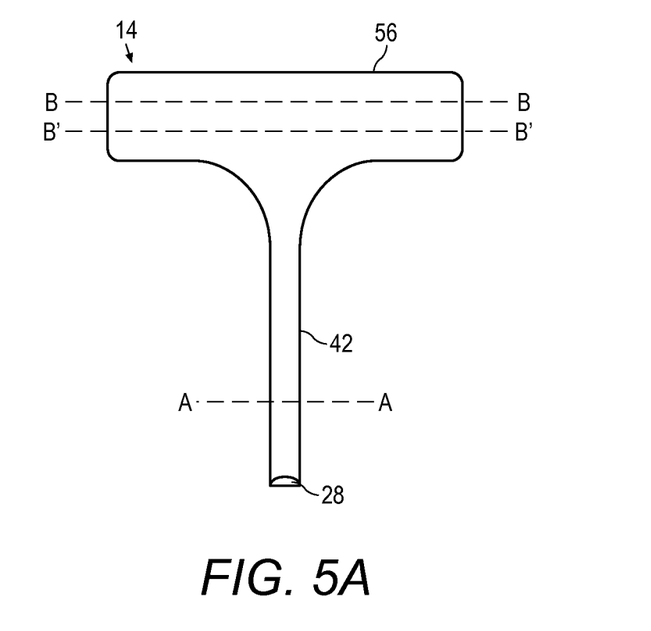
FIG. 5A shows a top view of an air collecting portion of the mannequin.

The air collecting portion (14) in the present example is generally T-shaped with an open end coupled (28) to the inlet (11) and an air chamber (56) disposed between the plate (22) and the chest portion (20). The open end (28) may have a circular cross-section along the line A-A when inflated and the air chamber (56) may have a generally rectangular shape as shown in FIG. 5A. The air chamber (56) is disposed such that the plate (22) pivots away from the chest portion (20) when air is blown into the air collecting portion (14) through the inlet (11) and the plate (22) pivots towards the chest portion (20) when the air is released from the air chamber (56). The pivoting plate (22) with the air chamber (56) of the air collecting portion (14) located beneath it provides a simple and yet workable mechanism for simulating the human chest and the lungs. Optionally, the mannequin may contain multiple air chambers.

Figure 5B:
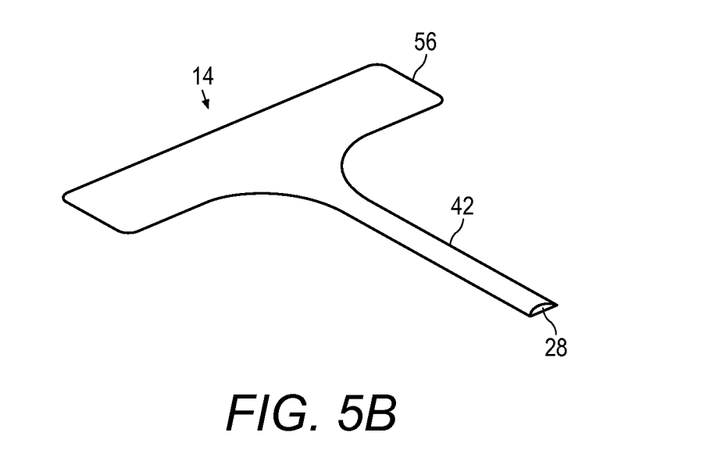
FIG. 5B shows a side view of the air collecting portion of FIG. 5A.

FIG. 5B is a perspective view of the air collecting portion (14) of FIG. 5A.

A joint (15) is provided between the head portion (10) and the chest portion (20) to simulate a human neck. The joint (15) is located at a position that is close to the ground on which the mannequin (100) is lying. An elongated air passage (42) links the open end (28) of the air collecting portion (14) to the air chamber (56) to simulate a human windpipe.

Furthermore, a nose (12) is provided on the head portion (10) to simulate the presence of a human nose. The chest portion (20) is adapted to house a compressible member (24) for simulating compression of the chest during cardiopulmonary resuscitation.

Figure 1B:
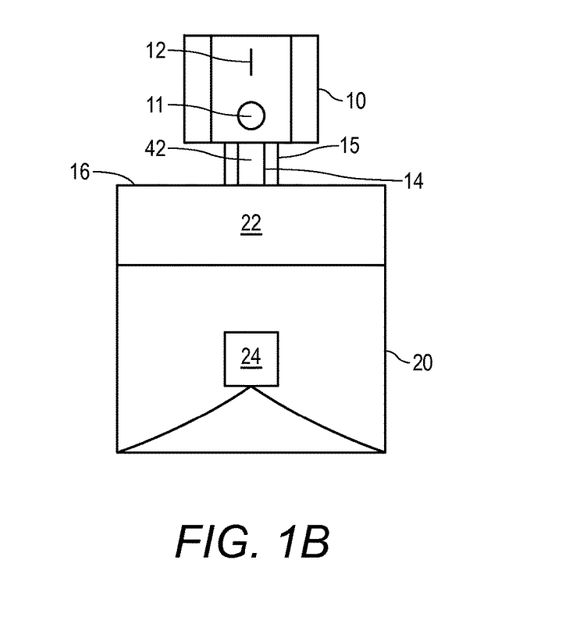
FIG. 1B is a top view of the mannequin.

FIG. 1B shows the top view of the mannequin (100) described in FIG. 1A. The elongated air passage (42) is located above the joint (15) and has a width that is thinner compared to the width of the joint (15). The location of the joint (15) is centralized with respect to the head portion (10) and the chest portion (20). The joint (15) is made of a flexible material that can bend when the head portion (10) is tilted with respect to the chest portion (20), to simulate the human position during mouth to mouth resuscitation. It would be appreciated that as long as the joint (15) does not interfere with the air collecting portion (14), the joint (15) can also be connected to anywhere on a side wall (29) of the chest portion (20) that is facing the head portion (10). A top view of the side wall (29) is found in FIG. 4B.

Figure 2:
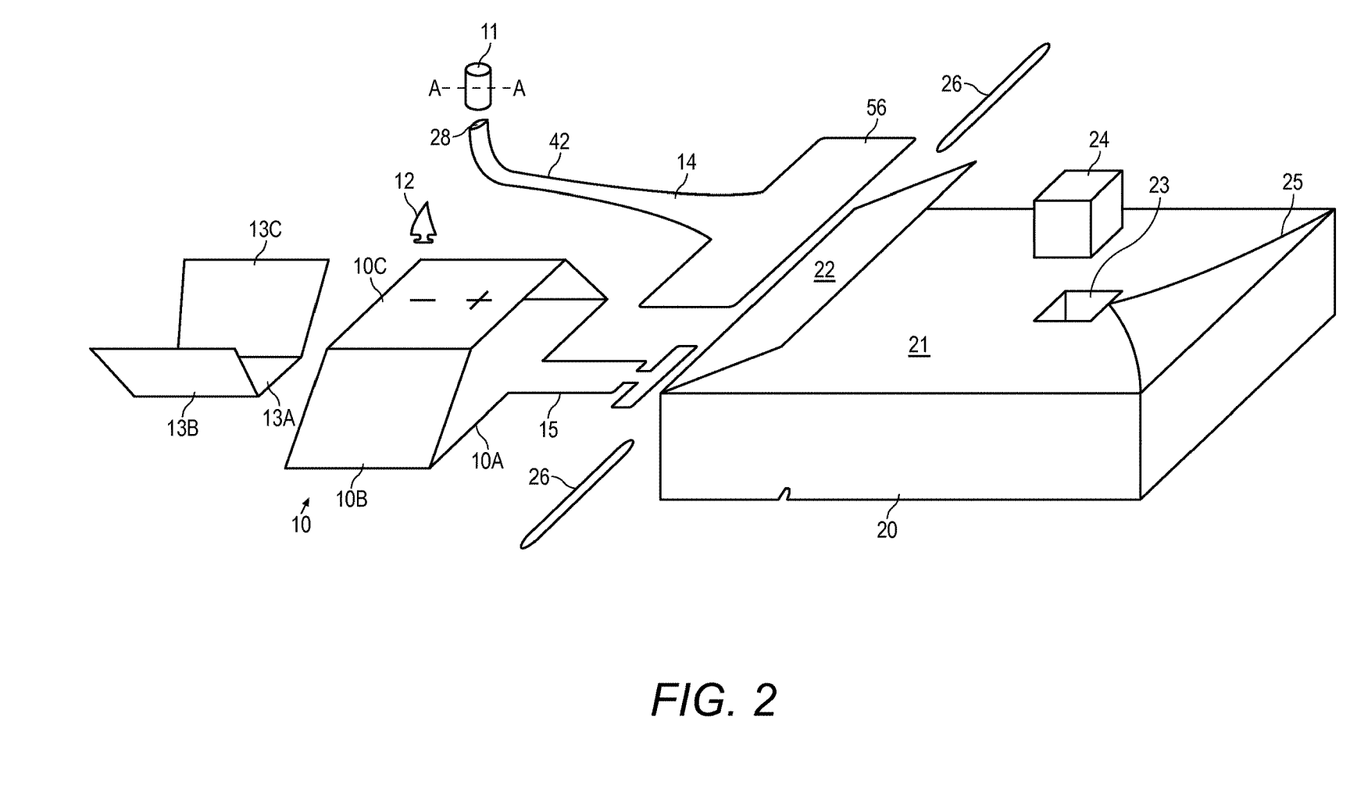
FIG. 2 is an exploded view of the mannequin.

FIG. 2 shows an exploded view of the mannequin in FIG. 1A. The figure illustrates the way in which the various parts of the mannequin are connected to each other.

The head portion (10) has a hollow centre and may have a trapezoidal cross-section. The head portion (10) has a bottom side member (10A) having largest surface area among all side members of the head portion (10). The bottom side member (10A) is adapted to lay on a surface on which the mannequin is to be placed during CPR practice. The large surface area provided by the bottom side member (10A) prevents the mannequin from wobbling during CPR practice and thus provides stability of the mannequin. The joint (15) extends from an end of the bottom side member (10A) facing the chest portion (20) to the chest portion (20). It is appreciated that the joint (15) may be removable from the head portion (10) and/or the chest portion (20). The head portion further includes a top side member (10C) located opposite to the bottom side member (10A). The top side member (10C) is adapted to fit the nose (12) and the inlet (11). The nose (12) and the inlet (11) may be removable from the head portion (10) respectively. The nose (12) may be fitted to the head portion (10) through a slit in the top side member (10C) and the inlet (11) may be inserted into an opening in the top side member (10C) so that part of the inlet (11) is within the head portion (10).

The chest portion (20) is shown as a rectangular body but it may also be shaped in any other suitable manner. All the parts of the mannequin (100) may also be shaped such that the mannequin (100) is in a form resembling a toy character. The chest portion (20) has a hollow centre and a top side member (21) with an opening (23) for housing a compressible member (24). The chest portion (20) may contain a customized compartment [e.g. an additional fixture that can be placed in the opening (23)] instead of just the opening (23) for housing the compressible member (24) for simulating compression of the chest of a human body during CPR such that the compressible member (24) remains in position and is not dislocated during practice. In the example illustrated in FIG. 2, the compressible member (24) is compressible at least 5 cm (centimeters) deep from its uncompressed state so as to simulate compressible depth of a chest of a human adult or adolescent. In other examples, the compressible member may be compressible up to a maximum of 5 cm (centimeters) deep so as to simulate compressible depth of a chest of a human child or infant. It is appreciated that the value of 5 cm is just a feasible example for determining sufficient depth for the simulation of the compressible depth of a human adult, adolescent, child or infant, which may vary in size. Other values that can provide the simulation required are also possible. During CPR practice, the compressible member (24) can be pushed towards the surface on which the mannequin is lying by about 5 cm by the CPR practitioner to simulate the magnitude of chest compressions required during cardiopulmonary resuscitation of a human. FIGS. 4C and 4D show the compressible member (24) at its uncompressed and compressed states respectively.

Advantageously, the head portion (10) with the hollow centre and the chest portion (20) with the hollow centre make the mannequin light in weight and portable.

The compressible member (24) may be a resilient foam material for simulating chest compression during CPR, or it may be made of other compressible elastic materials having similar characteristics of the resilient foam. The figures show a cuboid shape that the compressible member could assume, but it is appreciated that the shape may not be limited to cuboid only. Furthermore, functional equivalents of the compressible member such as one including a spring may be used.

The chest portion (20) is provided with simulated ribs (25), which may be in the form of embossed and/or etched structures on a surface of the top side member (21), for the user to be aware of presence of ribs of a human. The ribs assist the CPR practitioner in determining the right spot to compress the chest during CPR. The precautionary steps taken by the CPR practitioner to avoid pressing and breaking the ribs of a living being in real life situations can be simulated with the presence of the ribs (25) on the chest portion (20). It is appreciated that in other examples, the ribs (25) may be just drawings or markings on the chest portion (20) without having any embossed and/or etched structures on the surface of the top side member (21).

Figure 3A:
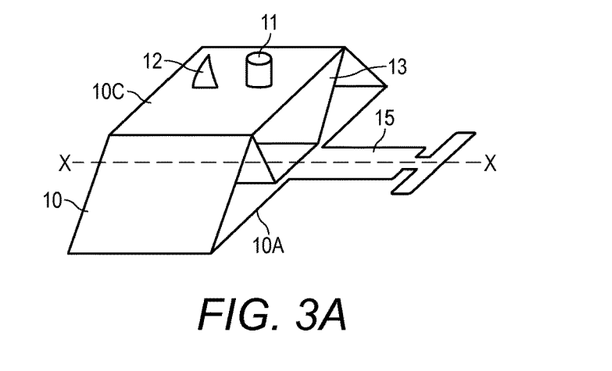
FIG. 3A shows a perspective view of the head portion of the mannequin.
Figure 3B:
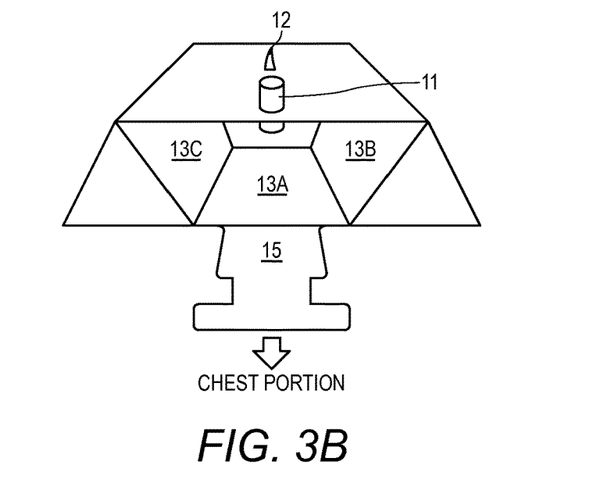
FIG. 3B shows a side view of the head portion facing the chest portion.

FIGS. 2 and 3B show that the hollow centre of the head portion (10) contains internal support members (13A, 13B, and 13C) that are joined to one another for maintaining the shape of the head portion (10) of the mannequin.

Figure 3C:
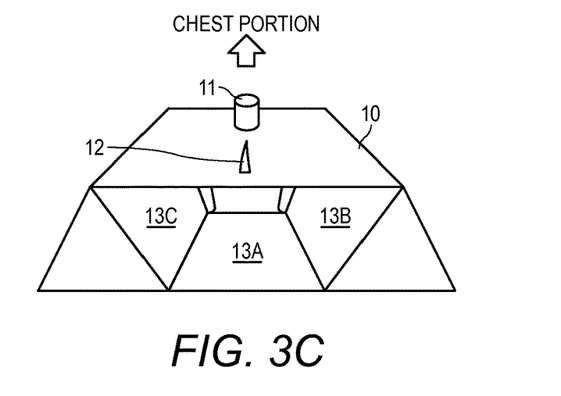
FIG. 3C shows a side view of the head portion viewed from a direction opposite to that in FIG. 3B.
Figure 3D:
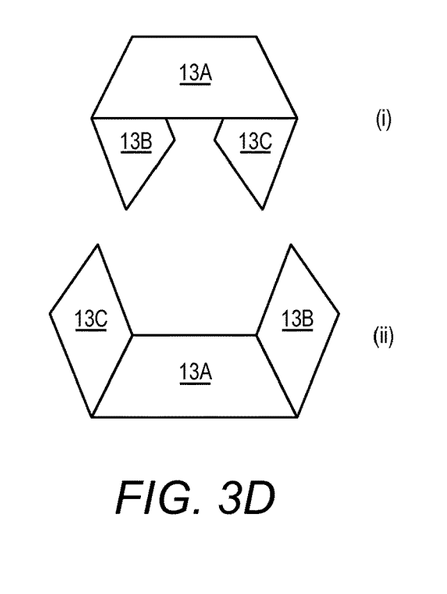
FIG. 3D illustrates orientation of support members for placement inside the head portion of the mannequin.

FIGS. 3B and 3C are side views of the head portion (10) of FIG. 3A and the arrows in FIGS. 3B and 3C indicate the direction in which the head portion (10) is to be fitted to the chest portion (20). FIG. 3D (i) and (ii) show two possible orientations of the internal support members for placement inside the head portion (10). The support member 13A may be arranged to be in contact with either the top side member (10C) [i.e. FIG. 3D(i)] or the bottom side member (10A) [i.e. FIG. 3D(ii)] of the head portion (10). With regard to the orientation shown in FIG. 3D(ii), edges of the support members 13B and 13C are in contact with corners formed by the top side member (10C) and side members of the head portion (10). The corners are formed as a result of the trapezoidal shape of the head portion (10). As for the orientation shown in FIG. 3D(i), edges of the support members 13B and 13C are each in contact with spaced apart locations on the bottom side member (10A). It is appreciated that the support members 13B and 13C are oriented in such a way to maintain the trapezoidal shape of the head portion (10) and to prevent the head portion (10) from being crushed or flattened easily. Optionally, the head portion (10) may have slits for slotting the edges support members 13B and 13C to achieve greater sturdiness of the head portion (10).

Figure 3E:
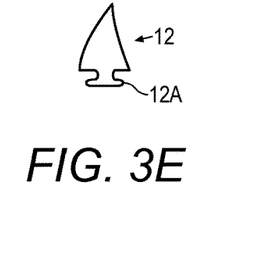
FIG. 3E shows a nose flap of the mannequin.
Figure 3F:
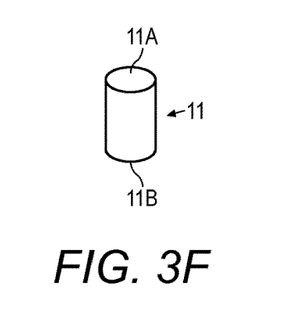
FIG. 3F shows an inlet or mouth of the mannequin.

The nose (12), shown in FIG. 3E as an example, is a triangular flap with a broad end (12A) adapted to fit the nose (12) to the head portion (10). While performing CPR on a person in distress, one is required to grasp the person's nose in between one's thumb and index figure. The nose (12) simulates the real human nose and allows grasping of the nose in between the thumb and index figure. FIG. 3F shows an example of the inlet (11). The inlet (11) is in the form of a hollow tube with openings 11A and 11B at both ends of the tube.

Besides the nose (12) and the inlet (11) simulating the human nose and human mouth respectively, the head portion (10) may have other human facial features, including eyes (not shown), and ears (not shown) in order to simulate a human look and provide users with an experience that is closer to a real human face.

Figure 4A:
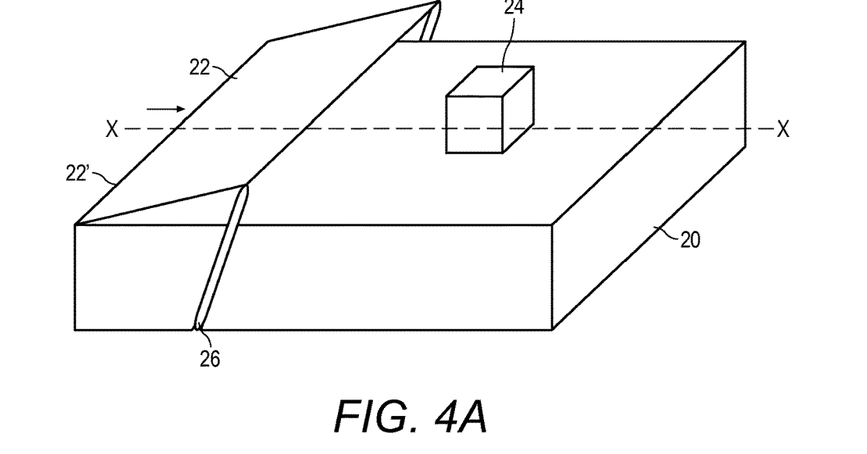
FIG. 4A shows details of a chest portion of the mannequin.

FIG. 4A shows the plate (22) being pivotably coupled to the chest portion (20). It is appreciated that the plate (22) may be removable from the chest portion (20). The plate (22) pivots about a joint (22') joining the plate (22) and the chest portion (20). A biasing mechanism (26), such as a spring, elastic chord(s), elastic fabric, rubber band(s) and the like, for biasing the plate (22) in a direction towards the chest portion (22) is provided. The biasing mechanism (26) functions to assist in pushing air out of the air chamber (56). A possible arrangement of the biasing mechanism (26) illustrated in FIG. 4A uses elastic chords or the like to link a movable end of the plate (22) to the chest portion (20). Other similar arrangements capable of pushing air out of the air collecting portion (14) may also be used.

Figure 4B:
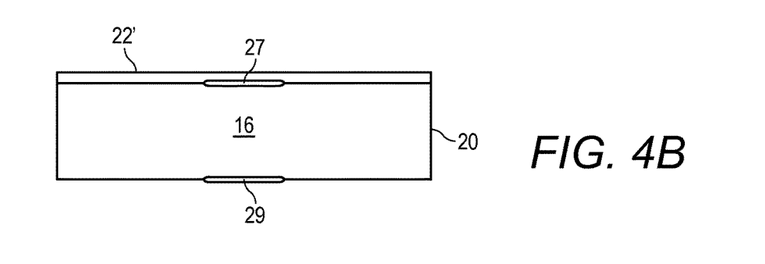
FIG. 4B shows a side view of the chest portion proximal to the head portion.
Figure 4C:
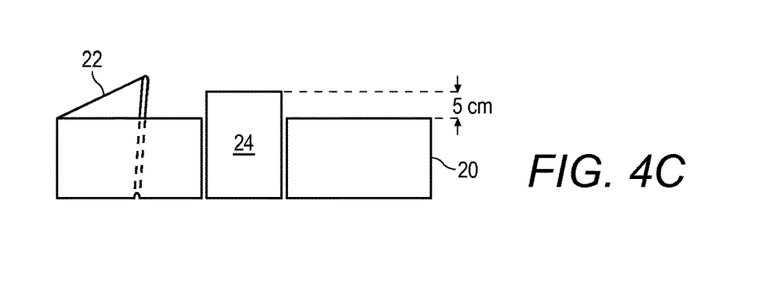
FIG. 4C shows a cross-section of FIG. 4A along line X-X when the plate is in a raised position, and the compressible member is not compressed.
Figure 4D:
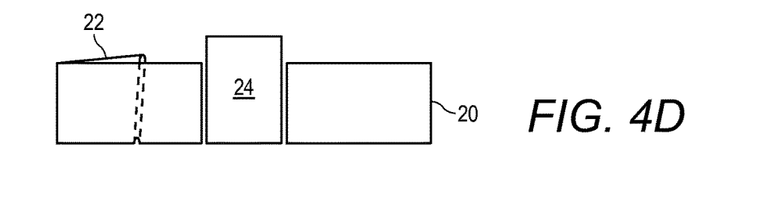
FIG. 4D shows a cross-section of FIG. 4A along the line X-X when the plate is in a rest position, and the compressible member is compressed.

Two passages (27 and 29) are shown in FIG. 4B. The passage 27 located in the region where the plate and the chest portion are coupled allows the air collecting portion (14) to pass through. The passage 29 located vertically below the passage 27 on a side of the chest portion (20) facing the head portion (10) receives part of the joint (15) for joining the head portion (10) and chest portion (20) to form a mannequin.

FIGS. 4C and 4D show the compressible member (24) at its uncompressed and compressed states respectively.

Figure 5C:
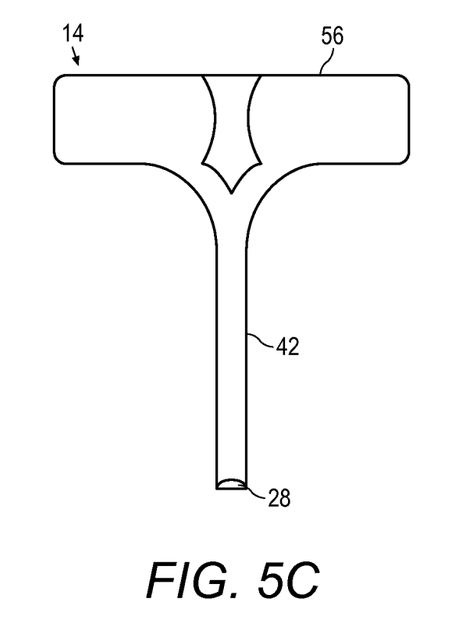
FIG. 5C shows a side view of a multi-chambered air collecting portion.
Figure 5D:
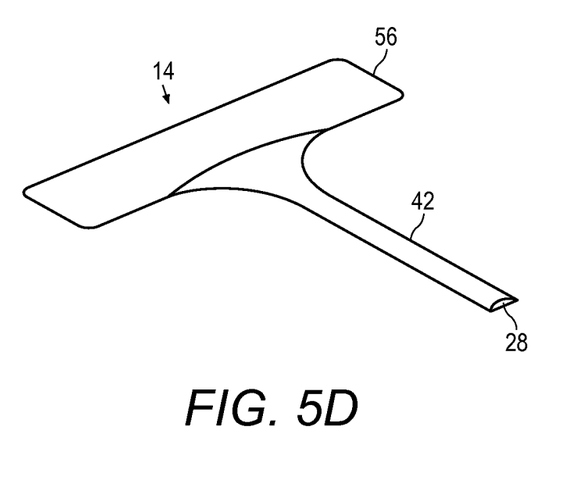
FIG. 5D shows a side view of a two-part air collecting portion.

The air chamber (14), shown in FIG. 5A-D, is generally a T-shaped hollow structure with the elongate air passage (42) linking the open end (28) to the air chamber (56). The air collecting portion (14) may either be a unitary structure or contain discrete segments as shown in FIG. 5D. The air collecting portion (14) is made of a thin and flexible material, such as plastic or the like. In the present example, the air collecting portion has (14) a capacity of 400 to 600 ml (milliliters) of air, which is equivalent to the capacity of human adult's or adolescent's lungs. Optionally, the air collecting portion may have (14) a capacity of 20 to 399 ml (milliliters) of air, which is equivalent to the capacity of human child's or infant's lungs. The air collecting portion (14) is removably coupled to the inlet (11) and the plate (22) so that a damaged, broken air collecting portion can be easily replaced. The air collecting portion of shapes other than that specified herein is possible. The T-shaped air collecting portion is merely an option.

The open end (28) receives air blown into the air collecting portion (14) by the CPR practitioner, and the air chamber (56) holds the air blown into the air collecting portion (14). The air collecting portion (14) extends from the inlet (11) along the axis of the neck and passes through the passage (27) as shown in FIG. 4B, which is located in a region where the plate (22) and the chest portion (20) are coupled such that the air chamber (56) lies beneath the plate (22). The air chamber (56) may be completely covered beneath the plate (22) to provide a simulation of the human chest. It would be appreciated that the air collecting portion may be multi-chambered (i.e. two or more air chambers) as shown in FIG. 5C (two chambers are shown in FIG. 5C) or a two parts structure as shown in FIG. 5D [i.e. the air chamber (56) and the air passage (42) are two separate parts that can be coupled to one another].

In another example, the air collecting portion (14) may have two air chambers configurable into a configuration whereby one of the air chambers stacks on top of the other when the air collecting portion (14) is deflated. When the two air chambers in this configuration are placed between the plate (22) and the chest portion (22), lesser air is required to be received by the air chambers to move the plate (22) compared to the case when the air chambers are not stacked. In this way, smaller lung capacity such as that of a child or an infant where lesser air is required to fill can be simulated.

Figure 6A:
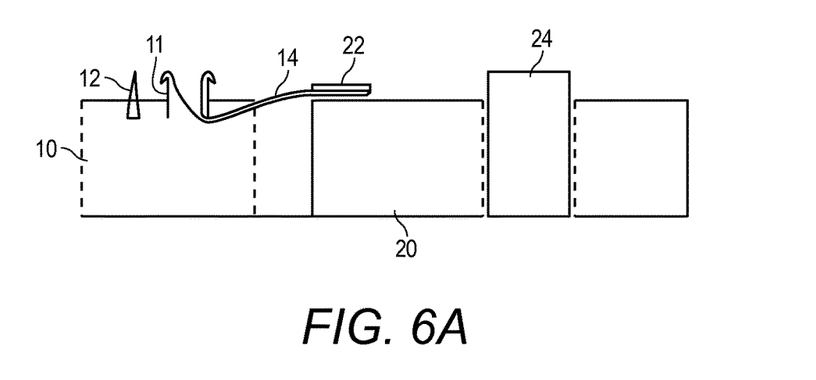
FIG. 6A is a cross-section along line X-X of FIG. 1 when the mannequin's head and its chest portion are in the same plane and the plate is in a rest position.
Figure 6B:
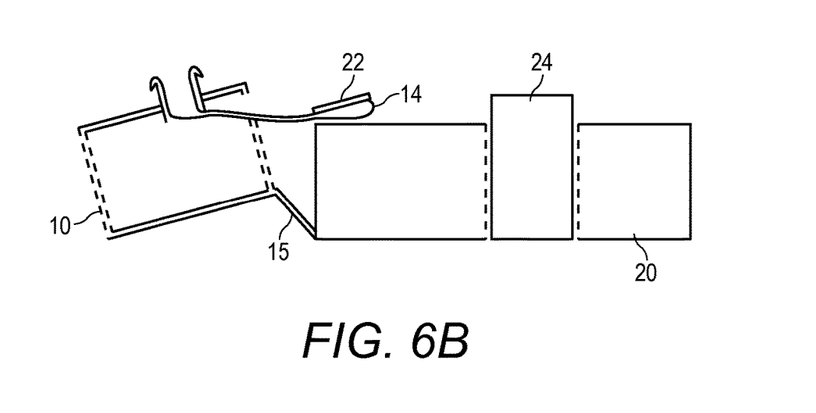
FIG. 6B is a cross-section along line X-X of FIG. 1 when the mannequin's head is tilted relative to the chest portion and the plate is in a raised position.

The head portion (10) may be movable between a first configuration where the inlet (11) is obstructing the air collecting portion (14) from collecting air and a second configuration where the head portion (10) is tilted relative to the chest portion (20) to allow the air collecting portion (14) to collect air. More specific to the present example, when the head portion (10) is not tilted, as shown in FIG. 6A, where in a first configuration, the head portion (10) and the chest portion (20) generally lie horizontally on the same plane and the air passage (42) of the air collecting portion (14) is obstructed by edges of the inlet (11). In this situation, the air chamber (56) does not inflate even when the CPR practitioner tries to blow air into the air collecting portion (14) through the inlet (11) as air is not allowed to enter the air collecting portion (28). The plate (22) remains biasing lying above the air chamber (56) and the plate (22) is in a rest position. In a second configuration, when the head portion (10) is tilted relative to the chest portion (20) and the plate (22), the air chamber (56) of the air collecting portion (14) and the air passage (42) of the air chamber (56) lie substantially along the same axis, and the air obstruction is cleared. The air blown into the air collecting portion (14) enters the air chamber (56) and inflates the air chamber (FIG. 6B). The inflated air chamber pushes the plate lying above it away from the chest portion (20) to a raised position where the plate (22) is at angle with respect to the surface (21) of the chest portion (20). This simulates the inflated human lung during inhalation. When the CPR practitioner stops blowing air into the inlet, air is released from the air chamber (56), as the biasing mechanism (26) is biasing to keep the plate (22) against the chest portion (20) and bring the plate from the raised position back to the rest position. The pivoting movement of the plate simulates a human chest during cardiopulmonary resuscitation. As mentioned above, the plate (22) is biasing to pivot towards the chest portion (20) by a biasing mechanism (26) which can be elastic chords, elastic fabric or a spring.

The mannequin (100), including the inlet (11), may be mainly made of cardboard. As cardboard can be relatively inexpensive, the overall cost of producing the mannequin is reduced. The mannequin is also environmentally friendly and can be easily disposed without causing much adverse affect on the environment. The mannequin may also be made of other inexpensive materials, such as plastic or the like. The low cost of the mannequin allows for each participant in a group CPR training session to be equipped with a mannequin, and therefore provides an effective training tool for training the public. The mannequin with a resilient foam as a compressible member is robust enough to withstand training involving chest compression for about 30 times, and repeated blowing of air into the air collecting portion to simulate mouth to mouth resuscitation.

The mannequin may also be supplied as a kit comprising unassembled parts of the mannequin. Users can assemble their own mannequins for practicing the CPR. For example, the kit may contain in an unassembled state, the head portion (10 in FIG. 1), the chest portion (20 in FIG. 1) and the air collecting portion (14 in FIG. 1), and optionally a compressible member (24 in FIG. 1), the inlet (11 in FIG. 2), the nose (12 in FIG. 1), and/or a plate (22 in FIG. 1) for assembly into a mannequin.

The mannequin may be supplied in various sizes and shapes to suit the users and their objectives. For example, the mannequin may be shaped as a toy, such as a teddy bear, for children to practice CPR. Similarly, small size mannequins may be made available to users for practicing CPR on children or infants.

Based on the above, a low cost mannequin using inexpensive material could be provided. The low cost mannequin could be made available to common people and masses at an affordable price. Schools, first aid training centers, and the like that routinely engage in group CPR training sessions can purchase the low cost mannequin for each of their students in the group training sessions. Advantageously, everyone in the group can receive hands-on practice using their personally issued mannequin. In the broad picture, the low cost mannequin benefits people in the learning and practicing of the life-saving skill of CPR.

Many modifications can be made to a mannequin for practicing cardiopulmonary resuscitation and a kit for assembling the mannequin for practicing cardiopulmonary resuscitation by those skilled in the art having the understanding of the above described disclosure together with the drawings. Therefore, it is to be understood that the mannequin for practicing cardiopulmonary resuscitation and the kit for assembling the mannequin for practicing cardiopulmonary resuscitation is not to be limited only to the above description contained herein.

The invention claimed is:

1. A mannequin for practicing cardiopulmonary resuscitation comprising:
   a head portion having an inlet;
   a chest portion;
   a plate pivotably coupled to the chest portion; and
   an air collecting portion comprising an air chamber, an end of the air collecting portion being coupled to the inlet and the air chamber being disposed between the plate and the chest portion such that the plate pivots away from the chest portion when air is blown into the air chamber through said inlet and the plate pivots towards the chest portion when air is released from the air chamber,
   wherein the head portion has a hollow center and includes a bottom side member with a permanently flat surface configured to contact a surface on which the mannequin is to be placed, the head portion having a trapezoidal cross-section and the flat surface of the bottom side member having the largest surface area among all surfaces of the side members of the head portion,
   wherein the head portion is separable from the chest portion and the bottom side member is arranged to extend to form a joint for joining the head portion and the chest portion, and
   wherein the head portion is movable between a first configuration where (a) edges of the inlet obstruct the air collecting portion from collecting air and (b) the bottom side member and the joint are both in the same plane, and a second configuration where (x) the bottom side member is angled relative to the joint, (y) both the bottom side member and the joint are angled relative to the chest portion, and (z) the air obstruction at the air collecting portion is cleared.

2. The mannequin of claim 1, wherein the plate is biased to pivot towards the chest portion.

3. The mannequin of claim 2, wherein the plate is biased to pivot towards the chest portion by a biasing mechanism comprising an elastic chord, an elastic fabric, or a spring.

4. The mannequin of claim 1, wherein the air collecting portion passes through a passage located in a region where the plate and the chest portion are coupled.

5. The mannequin of claim 4, wherein the air collecting portion is removable from the passage and the inlet.

6. The mannequin of claim 1, wherein the chest portion is adapted to house a compressible member for simulating compression of the chest portion during cardiopulmonary resuscitation.

7. The mannequin of claim 6, wherein the compressible member is made of a resilient foam material.

8. The mannequin of claim 6, wherein the chest portion comprises a compartment for housing the compressible member.

9. The mannequin of claim 6, wherein the compressible member is compressible at least 5 cm deep from an uncompressed state.

10. The mannequin of claim 6, wherein the compressible member is compressible up to a maximum of 5 cm deep from an uncompressed state.

11. The mannequin of claim 1, wherein the head portion, the chest portion or the plate is made of cardboard.

12. The mannequin of claim 1, wherein the chest portion comprises ribs being adapted for user contact to be aware of presence of ribs of a live being.

13. The mannequin of claim 1, wherein the mannequin is shaped into a form resembling a toy character.

14. The mannequin of claim 1, wherein the air collecting portion comprises another air chamber configurable to stack on top of the air chamber when the air collecting portion is deflated.

15. The mannequin of claim 1, wherein the inlet is removable from the head portion.

16. The mannequin of claim 1, wherein the plate is removable from the chest portion.

17. The mannequin of claim 1, the air collecting portion comprising an elongate air passage linking the end of the air collecting portion to the air chamber.

18. The mannequin of claim 17, wherein the air collecting portion has a capacity of 400 to 600 ml of air.

19. The mannequin of claim 17, wherein the air collecting portion has a capacity of 20 to 399 ml of air.

20. The mannequin of claim 1, wherein one or more support member is located within the hollow center.

21. A kit for assembling a mannequin for practicing cardiopulmonary resuscitation, the kit comprising:
a head portion having an inlet;
a chest portion;
a plate pivotably coupled to the chest portion; and
an air collecting portion comprising an air chamber;
wherein the end of the air collecting portion is for connecting to the inlet and the air chamber is for disposing between the plate and the chest portion such that the plate pivots away from the chest portion when air is blown into the air chamber through said inlet and the plate pivots towards the chest portion when air is released from the air chamber,
wherein the head portion has a hollow center and includes a bottom side member with a permanently flat surface configured to contact a surface on which the mannequin is to be placed, the head portion having a trapezoidal cross-section and the flat surface of the bottom side member having the largest surface area among all surfaces of the side members of the head portion,
wherein the head portion is separable from the chest portion and the bottom side member is arranged to extend to form a joint for joining the head portion and the chest portion, and
wherein the head portion is movable between a first configuration where (a) edges of the inlet obstruct the air collecting portion from collecting air and (b) the bottom side member and the joint are both in the same plane, and a second configuration where (x) the bottom side member is angled relative to the joint, (y) both the bottom side member and the joint are angled relative to the chest portion, and (z) the air obstruction at the air collecting portion is cleared.

22. The kit of claim 21 further comprising a compressible member for simulating compression of the chest portion during cardiopulmonary resuscitation.

* * * * *